(12) United States Patent
Breton

(10) Patent No.: US 12,511,363 B2
(45) Date of Patent: Dec. 30, 2025

(54) METHOD AND TOKEN FOR DOCUMENT AUTHENTICATION

(71) Applicant: COLOP Digital GmbH, Wels (AT)

(72) Inventor: Alex Breton, Nyland (SE)

(73) Assignee: COLOP DIGITAL GMBH, Wels (AT)

( * ) Notice: Subject to any disclaimer, the term of this patent is extended or adjusted under 35 U.S.C. 154(b) by 408 days.

(21) Appl. No.: 17/773,738

(22) PCT Filed: Nov. 4, 2020

(86) PCT No.: PCT/EP2020/080921
§ 371 (c)(1),
(2) Date: May 2, 2022

(87) PCT Pub. No.: WO2021/089598
PCT Pub. Date: May 14, 2021

(65) Prior Publication Data
US 2022/0414199 A1    Dec. 29, 2022

(30) Foreign Application Priority Data
Nov. 4, 2019   (EP) .................................... 19206951

(51) Int. Cl.
*G06F 21/33*   (2013.01)
(52) U.S. Cl.
CPC .................... *G06F 21/33* (2013.01)
(58) Field of Classification Search
CPC ............. G06F 21/33; G06F 2221/2151; G06F 21/6209; G06F 21/64; G06F 21/16; H04L 2209/608; H04L 9/3213; H04L 9/3236
(Continued)

(56) References Cited

U.S. PATENT DOCUMENTS

| 6,111,953 A | 8/2000 | Walker |
| 8,037,310 B2 | 10/2011 | Wolff |

(Continued)

FOREIGN PATENT DOCUMENTS

| CN | 103428001 A | 12/2013 |
| JP | 2003323512 A | 11/2003 |

(Continued)

OTHER PUBLICATIONS

International Search Report and Written Opinion of the International Searching Authority for International Patent Application No. PCT/EP2020/080921 mailed Jan. 20, 2021, 9 pages.

(Continued)

*Primary Examiner* — Jacob Lipman
(74) *Attorney, Agent, or Firm* — Merchant & Gould P.C.

(57) ABSTRACT

A method and token (3) for corroborating a document (25) includes having a registered token (3) with a token identity. The token (3) is able to print visual markings. A document identifier is obtained (18) based on at least the token identity and a timestamp. The document identifier is encoded (19) into a visual marking (24), and the visual marking (24) is applied to the document (25). A copy of the document (25) is obtained (27) with or without the visual marking (24), and copy is stored in association with the document identifier. The token (3) includes storage holding a token identity and a printing unit. The token (3) is configured to receive the visual marking (24) encoding a document identifier associated with the token identity and to print the received visual marking (24). A method also verifies a document (41) having a corresponding visual marking (42).

15 Claims, 12 Drawing Sheets

(58) Field of Classification Search
USPC .......................................................... 726/20
See application file for complete search history.

(56) References Cited

U.S. PATENT DOCUMENTS

| 9,855,785 | B1 | | 1/2018 | Nagelberg | |
|---|---|---|---|---|---|
| 10,110,385 | B1 | * | 10/2018 | Rush | ..................... H04L 9/3234 |
| 2006/0117182 | A1 | * | 6/2006 | Wolff | ..................... H04L 9/3247 |
| | | | | | 713/176 |
| 2007/0050696 | A1 | * | 3/2007 | Piersol | ................ G06F 21/6209 |
| | | | | | 715/209 |
| 2010/0046753 | A1 | * | 2/2010 | Inami | .................... H04N 1/4426 |
| | | | | | 380/243 |
| 2011/0133887 | A1 | | 6/2011 | Tian et al. | |
| 2015/0052615 | A1 | | 2/2015 | Gault et al. | |
| 2016/0364550 | A1 | * | 12/2016 | Pathak | .................... G06F 21/10 |
| 2019/0005268 | A1 | | 1/2019 | Gupta | |

FOREIGN PATENT DOCUMENTS

| JP | 201050906 A | 3/2010 |
|---|---|---|
| JP | 2013225223 A | 10/2013 |
| RU | 2591010 C2 | 10/2016 |
| RU | 2647643 C1 | 3/2018 |
| WO | 2016/113694 A1 | 7/2016 |

OTHER PUBLICATIONS

Extended European Search Report for European Patent Application No. 19206951.6 mailed Apr. 1, 2020, 7 pages.
Russian Office Action received for RU Application No. 2022114899/28 on Feb. 21, 2024, 22 pgs.
Japanese Office Action received for JP Application No. JP2022-525539 on Sep. 3, 2024, 11 pgs.
Chinese Office Action issued for CN Patent Appl. No. 202080075063.7 mailed Jan. 14, 2025, with English translation.
European Office Action (94.3) received for EP Application No. 20797797.6 on May 28, 2025, 7 pgs.

* cited by examiner

METHOD AND TOKEN FOR DOCUMENT AUTHENTICATION

This application is a National Stage Application of PCT/EP2020/080921, filed 4 Nov. 2020, which claims benefit of European Patent Application Serial No. 19206951.6, filed 4 Nov. 2019 and which applications are incorporated herein by reference. To the extent appropriate, a claim of priority is made to each of the above disclosed applications.

BACKGROUND OF THE INVENTION

The present invention concerns a method for corroborating a document, a method for verifying a document having a visual marking, and a token for printing a visual marking on a physical document.

Forgery and counterfeit of physical documents (i.e. mostly paper documents) is a widespread crime which represents a constant threat to society. It damages a large variety of business and institutions. It creates mistrust among citizens and against governmental institutions. It damages the trust on the rule of law and has a negative impact on the healthy economic development of many countries.

The advances that have taken place in the areas of digital photo- and printing equipment along with state-of-the-art image processing software, has made it easier for criminals to forge documents not only sporadically but sometimes even on a larger scale.

Some of the most common types of physical indicia used for document authentication purposes, involves the use of handwritten signatures, seals or stamp indicia, and more recently the use of holographic stickers, special non-visible and non-erasable ink and even the use of synthetic DNA. The aim of all these different types of indicia is to prove the authorship of the document to which it has been applied.

Current verification processes for the above-mentioned physical authentication are cumbersome because often they involve forensic sciences and methodologies so that the suspected tampered document must be submitted to a laboratory. Subsequently, long lead times are needed just to clarify whether a document is authentic or not.

In more recent times, there has been a great development of digital-based methodologies for document authentication. Powerful encryption algorithms, digital signatures along a combination of public- and private keys have enabled document transactions online which in principle are less susceptible to forgery than their physical counterparts.

Most of the existing prior art is based on the use of 2D matrix codes with no connection to the context to where they have been applied and based on the first usage only where only the authenticity of the code itself is verified.

U.S. Pat. No. 8,037,310 B2 discloses a method that combines digital and physical (or visual) authentication methodologies in an integrated, unified manner. As well as providing indicia of digital authentication, the system of such invention generates a physical artefact that can be validated by unaided human visual perception. The invention thus claims to provide an opportunity to improve the level of trust in authentication of documents, while preserving the advantages of both traditional and digital authentication mechanisms. The limitation of such invention is the requirement of at least one auxiliary document as well as the absence of a token mechanism and system to verify the signatory authority of the person executing the authentication method over the original document. An additional limitation of such invention is the inability to authenticate a fully electronic document or document batches without the need of printing them out as physical documents.

Hence, there is a need for a robust authentication (and corroboration) method and a corresponding verification method which is fast, simple, affordable and reliable.

US 2011/133887 A1 discloses a method for authenticating a printed document. The authentication is based on comparing the document with an electronic copy thereof. The electronic copy is obtained using document management information embedded in barcode markers printed on the document itself. The document management information may comprise a document ID and may be encoded in a two-dimensional barcode. The document management information does not contain information concerning the identity of a device used for creating the barcode. There are no technical measures to support tracing the barcode to its creator.

U.S. Pat. No. 10,110,385 B1 discloses a method and system providing a signature scheme for physical documents. A user seeking to verify a signed document can use an identity verification token to scan a quick response (QR) code containing a document identifier from the document. With the document identifier, they may retrieve an electronic copy of the document from an identity registrar and compare the displayed.

WO 2016/113694 A1 discloses a scheme with an URL printed on a document, the URL providing access to a copy of the original document for verification.

US 2015/052615 A1 discloses a QR-code added as a marking to a document, including an identifier to retrieve a document copy.

It is an object of the present invention, to create a verifiable association between a corroborated document and a particular trusted physical token used for corroboration.

SUMMARY OF THE INVENTION

The invention proposes a method of the kind stated in the outset, the method comprising:
 having a registered token with a token identity, wherein the token is able to print visual markings,
 obtaining a document identifier based on at least the token identity and a timestamp,
 encoding the document identifier into a visual marking,
 applying the visual marking to the document,
 obtaining a copy of the document with or without the visual marking,
 storing the copy in association with the document identifier.

Optionally, the method may comprise, before storing the copy,
 printing the visual marking using the token, and
 retrieving and verifying the printed visual marking.

The visual marking may be printed on the document, if the document is a physical document, or the visual marking may be printed on any (physical) substrate, if the document is an electronic document.

In one embodiment, the method may include, before storing, encrypting and/or scrambling the copy. The stored copy is not a clear copy, but an encrypted and/or scrambled version of the copy of the document. Scrambling in this case refers to a reversible (e.g. deterministic) operation performed on the data. For example, a random number generator with a predefined constant seed may be used for scrambling.

In this context, the present method may further comprise encrypting the copy using an encryption key associated with the token identity. The copy of the document stored in association with the document identifier in this case is an encrypted copy. In order to access the content of the document, the encrypted copy needs to be encrypted with a decryption key, which may be the same key as the encryption key or a cryptographically associated decryption key (e.g. a private key corresponding to a public key, which is used as encryption key).

For example, an optional embodiment of the method for corroborating a document may comprise:
- having a registered token with a token identity, wherein the token is able to print visual markings,
- obtaining a document identifier based on at least the token identity and a timestamp,
- obtaining a document key,
- encoding the document identifier and the document key into a visual marking,
- applying the visual marking to the document,
- obtaining a copy of the document with or without the visual marking,
- encrypting the copy such that it can be decrypted using the document key,
- storing the encrypted copy in association with the document identifier.

Further optionally, the token maybe paired to an internet enabled host device which allows one or more of the following:
- secure login into the token by means of biometric-, password- and/or pin identification of an authorized user,
- send document identifier to a document storage database,
- retrieve a visual marking from the said database,
- send a visual marking to the token,
- taking an image or sequences of images of the document,
- sending encrypted and/or scrambled images to the document storage database,
- receiving a confirmation message from the document storage database.
- The host device may generally be used as a gateway for the token to gain access to the document storage database. The document storage database is not limited to a single database instance or location and may generally be provided by a document storage service.

In another embodiment, the document may be a physical document and obtaining a copy of the document may comprise taking an image of the physical document before or after applying the visual marking to the document. The image taken of the physical document may be a digital image; in that case the copy corresponds to the image data of said image. If the image is recorded only after applying the visual marking to the document, the copy will contain a representation of the visual marking potentially including any information encoded in the visual marking; otherwise, no such representation and no information encoded therein need to be present in the copy.

Applying the visual marking to the document optionally comprises printing the visual marking on the physical document using the token. The token may be a printing device, for example a hand-operated printer that is manually moved over a target medium.

In case the document is an electronic document, applying the visual marking to the document optionally comprises modifying the electronic document to include the visual marking. in other words, the electronic representation of the document is modified such that e.g. when viewing the electronic document on a screen, the visual marking is displayed as part of the electronic document or as an attachment or annotation to the electronic document.

According to a further embodiment, storing the copy in association with the document identifier may comprise transmitting the copy together with the document identifier to a document storage service, wherein the document storage service stores the transmitted copy and an association with the document identifier. the document storage service may be a centrally hosted service. It may be provided by a trusted third party, for example a supplier of the physical token. The document storage service may also be a distributed service. The actual data storage of the document copies transmitted to the document storage service may be provided by a separate storage system, e.g. from yet another third party. this case, the document content on the one hand and the association or link between that content (in the form of the transmitted copy) and the document identifier may be stored by different systems and potentially in different places. The document storage service may require an authentication before accepting transmission of a document copy.

The document storage service may comprise a database of blocks and storing the transmitted copy may comprise creating a block that contains at least a cryptographic link to the previous block, the timestamp of the document identifier and a cryptographic hash of the transmitted copy. Generally, the database may be a list of records, where each item in that list is called a "block". Subsequent blocks are cryptographically linked. For example, each block may contain a cryptographic hash of the previous block. Due to this linking from block to block, such a database is also called a "block chain". Typically, the transmitted copy itself will not be part of a block, but it may be associated with a particular block via the cryptographic hash. The transmitted copy of the document may be stored in the same database or a different database or system. Different transmitted copies of documents may be stored at different locations. At the same time, copies from different storage locations may be linked from (or associated with) different blocks within the same database of blocks.

At the same time and corresponding to the method for corroboration described above, the invention also proposes a method for verifying a document having a visual marking, the method comprising:
- retrieving the visual marking from the document,
- analysing the visual marking to obtain a document identifier,
- retrieving a copy of the document using the document identifier,
- providing the copy for verification of the document.

The method for verifying a document applies in particular to documents corroborated according to the method described previously. The visual marking retrieved from the document and analysed to obtain a document identifier is generally the same visual marking that has been described in connection with the method for corroborating above.

Optionally, within the method for verifying a document, analysing the visual marking may comprise obtaining a document key, wherein the retrieved copy is encrypted and the method may comprise decrypting the encrypted copy using the document key to obtain an unencrypted copy, wherein the unencrypted copy is provided for verification of the document. The document key may be stored separately from the copy of the document. For example, the document key may be encoded the visual marking and thus stored (perhaps exclusively) on the original physical document itself.

According to one embodiment of the method for verifying a document having a visual marking, the method may comprise:

retrieving the visual marking from the document, analysing the visual marking to obtain a document identifier and a document key from the visual marking, retrieving an encrypted copy of the document using the document identifier, decrypting the encrypted copy using the document key to obtain an unencrypted copy, providing the unencrypted copy for verification of the document.

According to another embodiment of the methods described above, the document may be a physical document and retrieving the visual marking from the document may comprise taking an image or a sequence of images of the physical document and locating the visual marking within the images. The image or sequence of images may be taken with a camera, for example a smartphone camera. Locating the visual marking within the images may include pre-processing and/or pattern recognition steps that are applied to the image data of said image.

Further optionally, retrieving the copy of the document may comprise sending a request with the document identifier to a document storage service and receiving the copy of the document associated with the document identifier from the document storage service. Access to the document storage service may be restricted to authenticated users; receiving the copy of the document may thus follow an authentication process between a host device and the document storage service.

In yet another embodiment, providing the copy for verification of the document may comprise displaying the copy on a screen for visual comparison. Alternatively or additionally, providing the copy for verification of the document allows for example to electronically process the retrieved copy, i.e. to determine a digital signature or other digital properties of the copy.

More specifically, providing the copy for verification of the document may optionally comprise performing a comparison between the copy and a new copy of the document with the visual marking and signaling the result of the comparison, wherein the new copy is obtained for the purpose of comparison verification. such an automated comparison facilitates the identification of forgery and fraud attempts.

At the same time and corresponding to the methods described above, the present invention also proposes a token for printing a visual marking, the token comprising a storage holding a token identity and a printing unit, wherein the token is configured to receive a visual marking encoding a document identifier associated with the token identity and to print the received visual marking. Optionally, the token may be configured to receive a visual marking encoding a document identifier associated with the token identity and a document key and to print the received visual marking. The storage holding the token identity may be configured such that the identity cannot be erased, removed or manipulated in any manner. For example, the identity may be defined by a numerical unique device identifier, e.g. having more than 40 bits or more than 80 bits or 96 bits. The token identity is not necessarily limited to a single numerical value; there may be multiple equally valid representations, e.g. by reading and concatenating different parts (e.g. single bits, half-words or words) of the device identifier according to a predefined deterministic algorithm. This algorithm may produce a well-defined sequence of valid token identities, such that the next token identity can only be predicted with knowledge of two or more previous token identities generated from the device identifier. Hence, in order to forge a valid token identity, one need to know those previous token identities. If the used token identities are registered, e.g. by a document storage service, any irregularity in the expected sequence of token identities noticed immediately and documents corroborated immediately before that moment and from then on could be indicated as potential counterfeits.

The token may be configured such that it verifies whether the token identity associated with the document identifier included in the received visual marking corresponds to the token identity of the token itself, i.e. the token identity held in its storage. Only if this verification succeeds, the printing unit is controlled to print the received visual marking.

The printing unit may be configured to delete the received visual marking after printing or even during printing, e.g. according to the printing progress. The printing unit may be configured to monitor a limited period of validity of the visual marking, e.g. a timeout associated with the visual marking. such a timeout may for example be relative to a timestamp embedded in the visual marking to avoid significant delays between duration of the visual marking and printing of the visual marking. Once the timeout has lapsed, the token irretrievably deletes any information of the visual marking.

Optionally, the token may be configured to authenticate a host device connected to the token before receiving a visual marking from said host device for printing. following the authentication, a pairing between the token and the host device may be established, for example represented by a session. Reception of a visual marking for printing is accepted by the token only as long as there pairing remains uninterrupted until the visual marking has been received successfully by the token. Typically, the token identity is transmitted during this pairing from the token by the host device acting as a gateway to a remote visual marking generator. That visual marking generator can be configured to match the received token identity with a list of authorised token identities and generate a visual marking and optionally also a document identifier for embedding in said visual marking if a match is found. Alternatively, the document identifier may be generated for example by the token and transmitted with the token identity to the visual marking generator.

The present disclosure also optionally proposes a system comprising a token as described above, an internet enabled host device and a document storage database, wherein the token is paired to the internet enabled host device, wherein the internet enabled host device is configured to provide one or more of the following: secure login into the token by means of biometric-, password- and/or pin identification of an authorized user, send document identifier to the document storage database, retrieve a visual marking from the document storage database, send a visual marking to the token, take an image or sequences of images of the document, send encrypted and/or scrambled images to the document storage database, receive a confirmation message from the document storage database.

In an optional embodiment, the document storage database of the system can be provided by a document storage service and the document storage service is configured to receive and store an encrypted copy of a document in association with a document identifier.

BRIEF DESCRIPTION OF THE DRAWINGS

Referring now to the drawings, wherein the figures are for purposes of illustrating the present disclosure and not for purposes of limiting the same, FIG. 1 schematically shows a flowchart of a process of initialising a token and using it in a method for corroborating a document with a visual marking.

DETAILED DESCRIPTION OF THE PREFERRED EMBODIMENT

Figure 1:
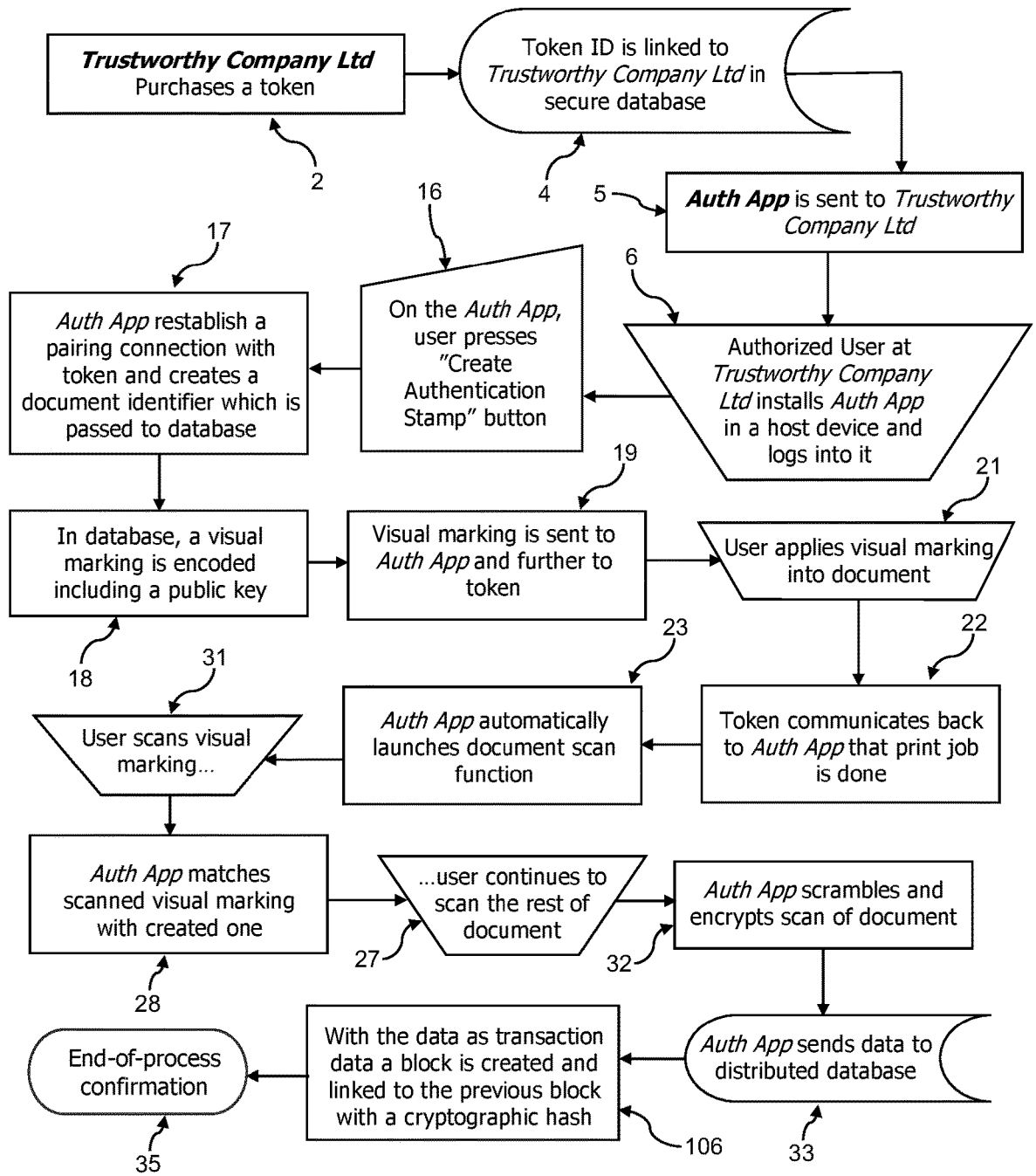

FIG. 1 shows a sequence of steps from obtaining a token according to the present disclosure until completing corroboration of a document. This sequence is an exemplary ideal sequence of steps, which ignores—for the purpose of illustration—any alternative paths based on situation-dependent conditions, user or technical faults or errors. the initial steps until the host device is configured need to be performed only once before the first use. These steps belong to an initialisation procedure 1 (compare also FIG. 17).

Figure 2:
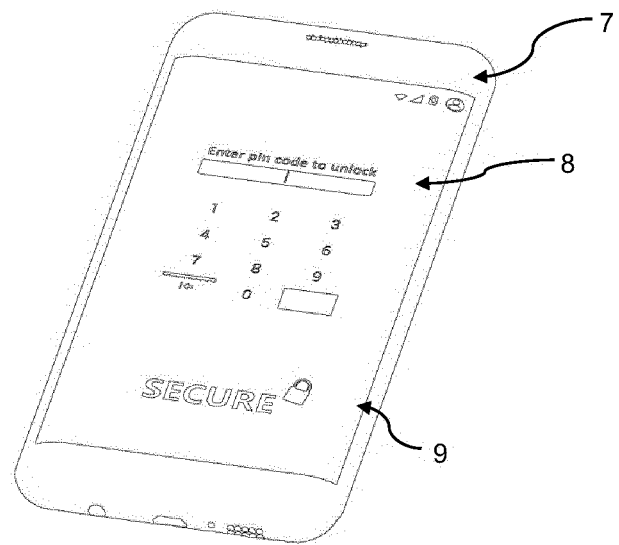
FIGS. 2-7 schematically illustrate the steps performed during the method illustrated in FIG. 1 from a user perspective.
Figure 7:
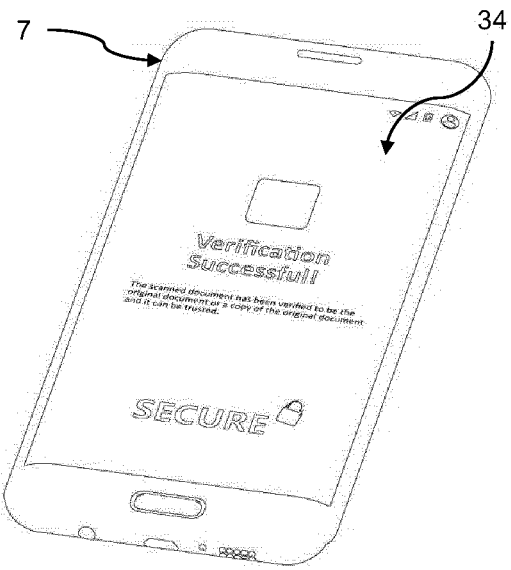

In the first step 2 and issuer, here called "Trustworthy Company Ltd" purchases a physical token 3 (also called "Authenticator") from a trusted vendor. The physical token 3 comprises a storage holding a token identity in the form of a unique device ID. The trusted vendor links 4 the unique device ID of the physical token with an account and identity of the issuer in a secure database managed by the trusted vendor. Subsequently, a software application (called "Ruth App") is sent 5 to the issuer. the issuer distributes 6 this software application to authorised users within the company, who install the software application on their respective personal devices 7 (e.g. smartphones) and login to the software application by entering their personal user credentials. The login to access the software application for corroborating may be performed by entering a PIN code and authentication dialogue 8 displayed on a screen 9 of the personal device 7 (see FIG. 2). As shown more detail in FIG. 7, after successful login, a pairing connection 10 (e.g. an encrypted wireless connection, such using Bluetooth or Wi-Fi) is established between the physical token 3 and the personal device 7. The personal device will thereby act as a host device for the token 3 as long as the pairing connection 10 remains intact. over the pairing connection 10, the host device 7 retrieves 11 a token identity. using the received token identity, the host device 7 sends a register request 12 comprising the received token identity as well as an identity of the personal device 7 to a document storage service 13. the document storage service 13 matches the received token identity against a list of valid and available token identities. it also verifies 14, whether the user identified by the user credentials at the software application has been associated with a registered issuer. If the match and the verification succeed, the document storage service 13 transmits a private authorisation key 15 to the host device 7 for future authentication with the document storage service 13. This step concludes the initialisation procedure 1.

Figure 3:
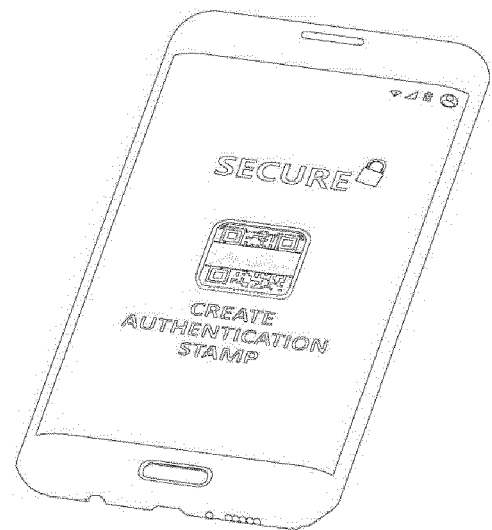

In order to perform corroboration of the document, the user enters 16 the command "create authentication stamp" in the software application (see FIG. 3). For example, there may be a graphical button that can be interacted with in order to issue the command. Following this command, the software application in step 17 establishes (or re-establishes) a pairing connection 10 between the host device 7 and the token 3 and creates a document identifier, which is sent 36 (see FIG. 17) to the document storage service 13, optionally together with a document key, also generated by the software application (or the document identifier is derived from the document key). The document identifier may have the form of a random link to a document storage location at the document storage service 13. Optionally, the software application may load the token identity, location coordinates (e.g. GPS-based), current date and time and numbering from the host device 7, e.g. the storage or system information, and send this or parts of this information to the document storage service 13 with the document identifier. In this context, numbering means that every print (or "stamp") operation is counted for every token (i.e. the total number per token). This is the accumulated stamp count equal to the number of times that the token has applied visual markings. In the next step 18, the document storage service 13 generates a visual marking, e.g. in the form of a QR-code. Due to the random nature and size of the document identifier, the visual marking is practically unique (although theoretically, the same visual marking may be generated multiple times by coincidence). In addition to the QR-code, the visual marking may be extended with an existing graphics in order to make the printed visual marking recognisable as such. The visual marking may include additional information received from the host device. It may also include a public key for accessing an encrypted copy of the document. Once it is ready, the visual marking is sent to the host device 7 and forwarded from there to the token 3 for printing. The visual marking may optionally be generated directly on the host device 7, such that the public key never leaves the host device 7 other than for printing by the—trusted—token 3. In that case, the document storage service 13 may be informed of the document identifier, but would not receive the full information embedded in the visual marking.

Figure 4:
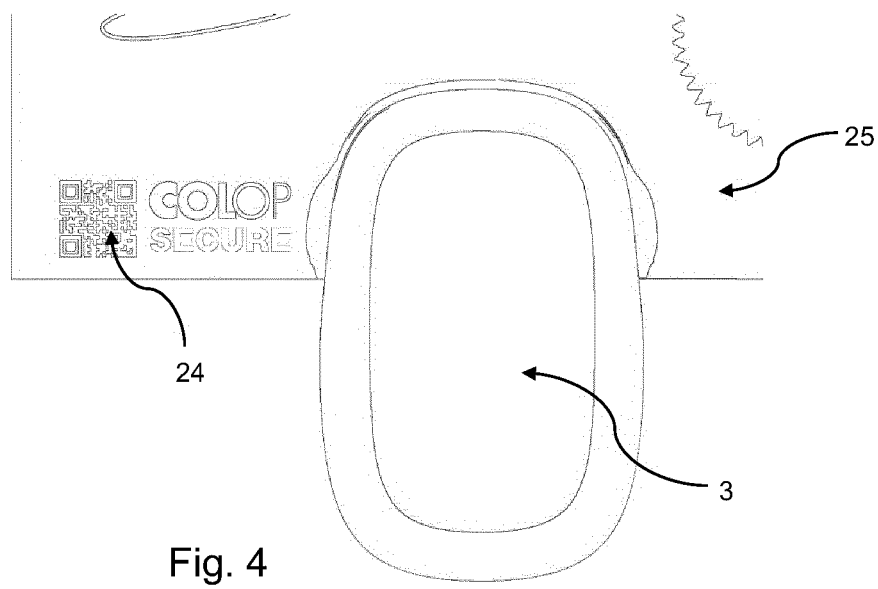
Figure 5:
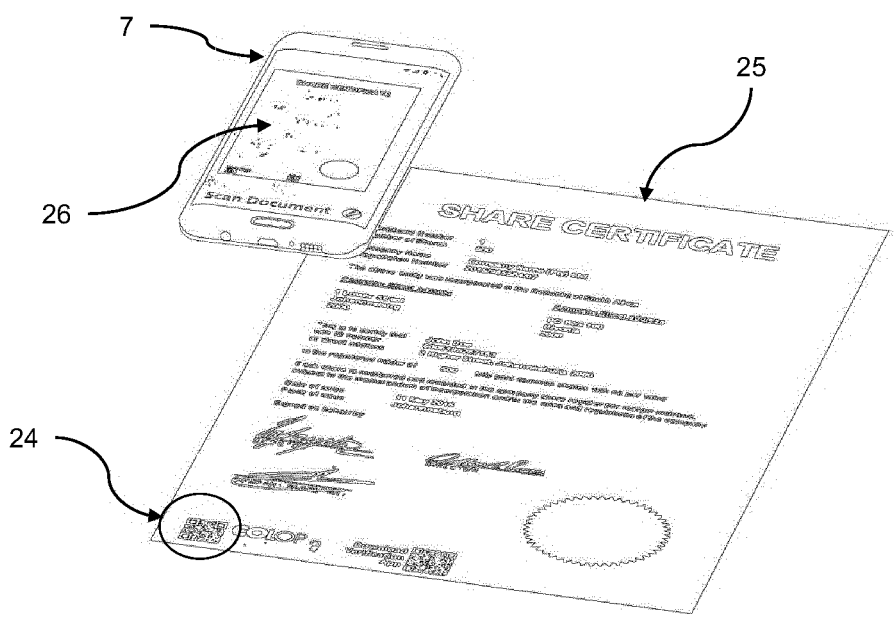
Figure 6:
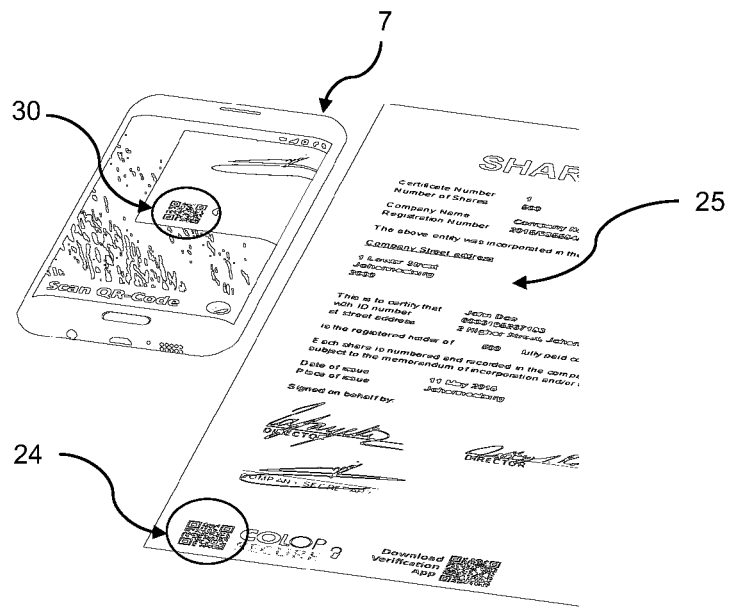

Once the visual marking is received by the token 3 for printing, the user applies (i.e. prints) 21 the visual marking 24 onto the physical document 25 using the physical token 3 (see FIG. 4). During the printing and when the printing is finished, the token 3 reports 22 the status of printing to the host device 7 and the software application. When the software application receives the notification that the printing is finished, it automatically launches 23 a marking scanning view 30 (see FIG. 6). In a first scanning step 31 the user is requested to scan the visual marking, i.e. to direct the camera such that the visual marking is in the view field of a camera of the host device 7. Based on this first scanned view, the software application does a verification 28 of the visual marking 24 by detecting and extracting the visual marking 24 from the first scanned image and comparing it to the generated version of the visual marking. If this verification 28 succeeds, the software application launches a document scanning view 26 (see FIG. 5). In a second scanning step 27, the user is requested to scan the entire document. The process of scanning the visual marking and then the entire document can optionally be implemented using a video stream instead of separate photos/scans. Using the video stream can give additional reliability and security to the process. Based on the second scanned view(s), the software application scrambles and encrypts 32 the second scanned view(s) showing the whole document and transmits 33 it as uploaded to the link previously created in the document storage service 13. With the document data as transaction data a block is created 106 and linked to the previous block with a cryptographic hash. When the block creation and linking succeeds, the document storage service 13 and, after receiving a confirmation 35, the software application confirms the corroboration by displaying a confirmation view 34 (see FIG. 7).

Figure 17:
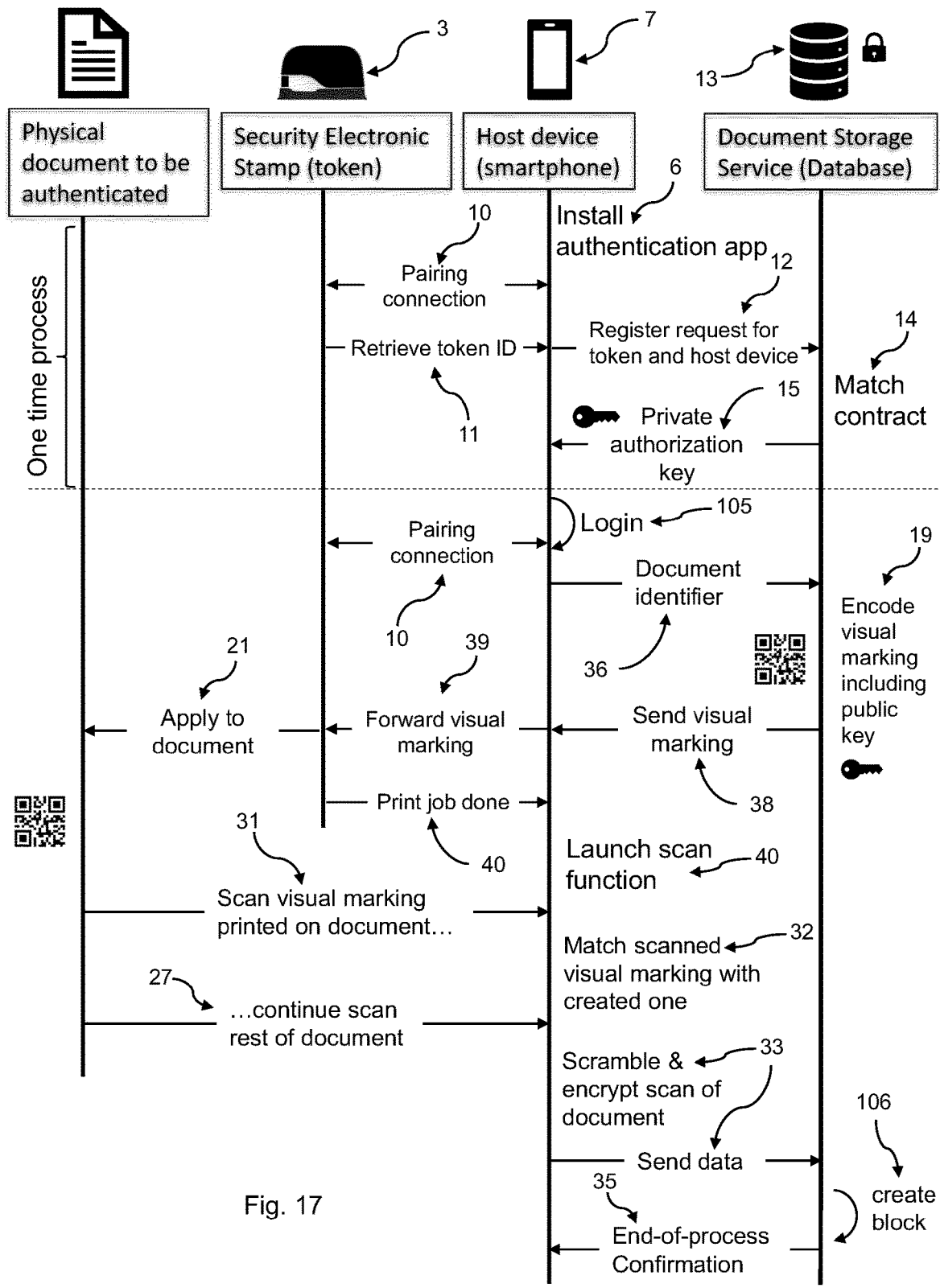
FIG. 17 schematically shows a sequence diagram of a method similar to the method shown in FIG. 1 for corroborating a physical document.

FIG. 17 shows additional aspects and variations of the method for corroborating a document according to the present disclosure. Specifically, in the example shown in FIG. 17, the host device 7, after authenticating the user by requesting a login 105, establishes a pairing connection with the token 3. The document identifier generated in step 18 according to FIG. 1 in this case is transmitted 36 to the document storage service 13. The document storage service 13 performs step 19 of generating a visual marking based on the received document identifier (unlike the embodiment shown in FIG. 1, where the visual marking is generated on the host device 7). In this example, a public key cryptographically associated with the private authorization key 15 is included in the visual marking. The generated visual marking is then transmitted 38, optionally in an encrypted form, back to the host device 7, which acts as a gateway and forwards 39 the visual marking on to the token 3, optionally after decryption and converting the image format for printing. However, the host device 7 does not store the visual marking after it has been transmitted to the token 3. The token 3 stores the received visual marking (or, more precisely, the image information representing the visual marking to be printed) in Random Access Memory (RAM). The printing step 21 for applying the visual marking to the document is performed by the user similar to FIG. 1 and after the printing, the token 3 maintains no information regarding the content of the visual marking. The token 3 notifies 40 the host device 7 of the finished printing job. In the example shown in FIG. 17, the software application then directly launches 29 the marking scanning view (i.e. a scan function of the host device 7). The user scans 31 the visual marking and the host device 7 performs directly the (final) verification 32. In that case, no preliminary verification 28 is necessary. If the (final) verification 32 succeeds, the software application launches 23 the document scanning view 26 and the use scans 27 the rest of the document. The scanning views may be different views or they may be different time spans in the same video recording. When the whole document is scanned, the method proceeds with step 33 as above. The document storage service 13, based on the received document information, creates 106 a block for appending to a block chain maintained or accessed by the document storage service 13. Once the new block is appended to the block chain, the document storage service 13 sends a confirmation 35 to the host device 7.

Figure 8:
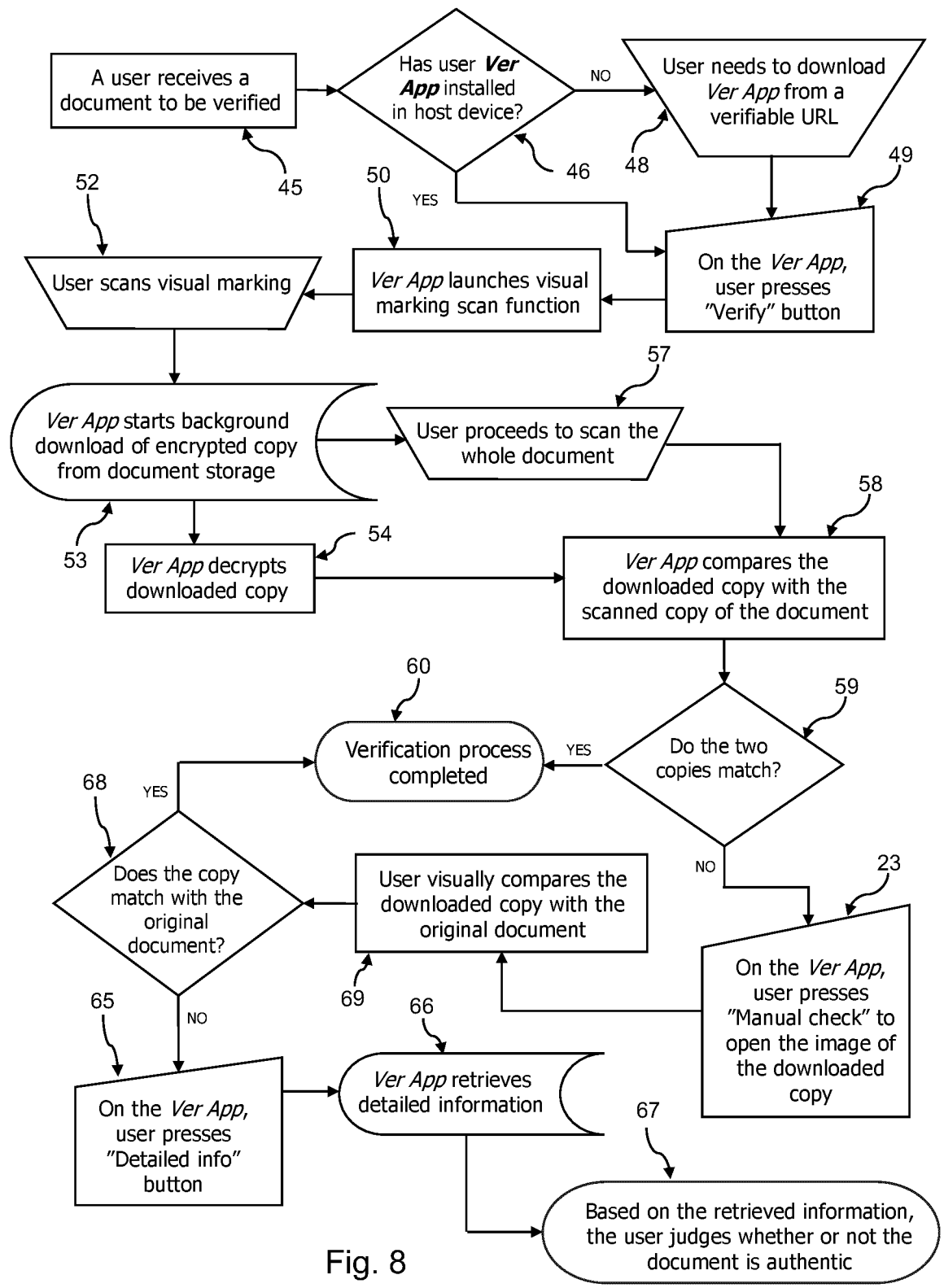
FIG. 8 schematically shows a flowchart of a process for verifying a document having a visual marking.
Figure 9:
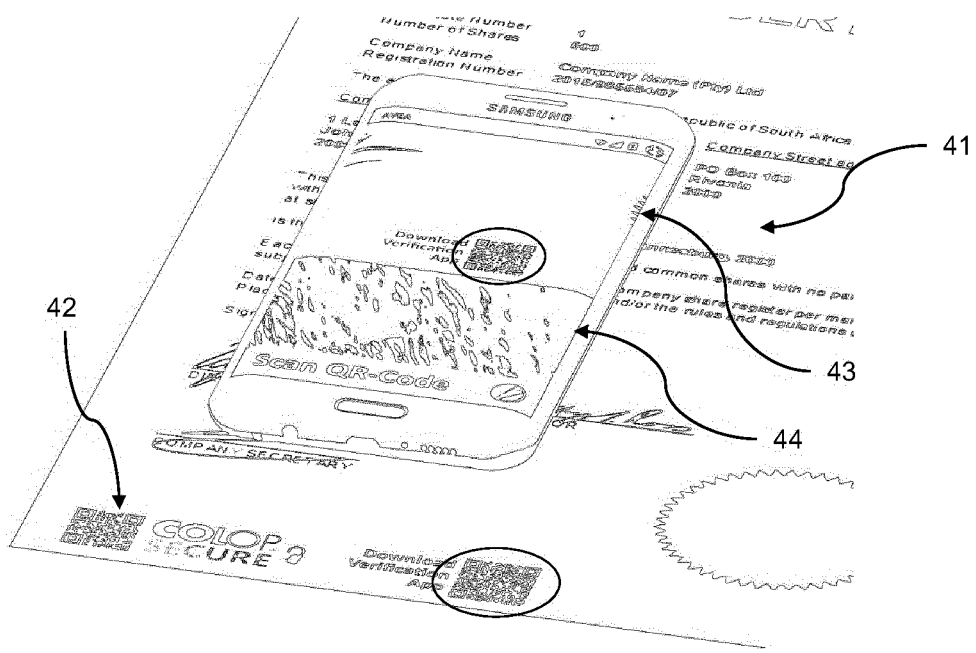
FIGS. 9-16 schematically illustrate the steps performed during the method illustrated in FIG. 8 from a user perspective.
Figure 10:
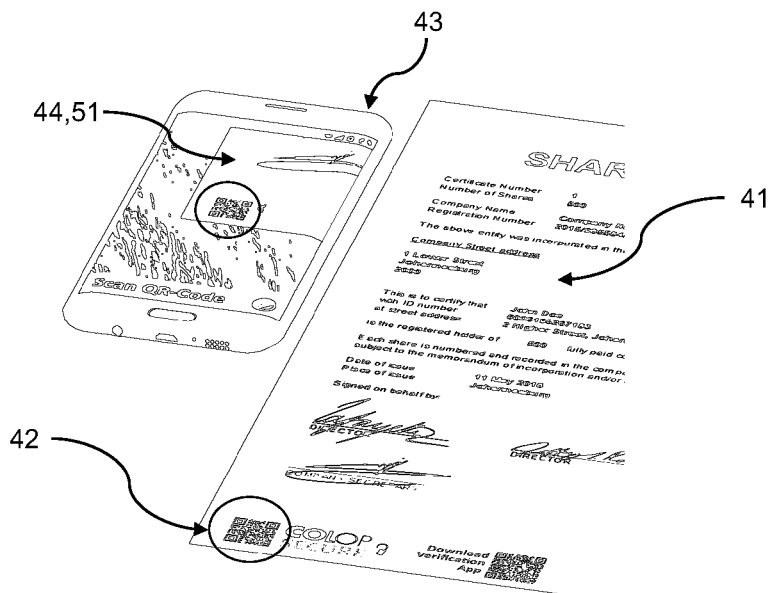
Figure 11:
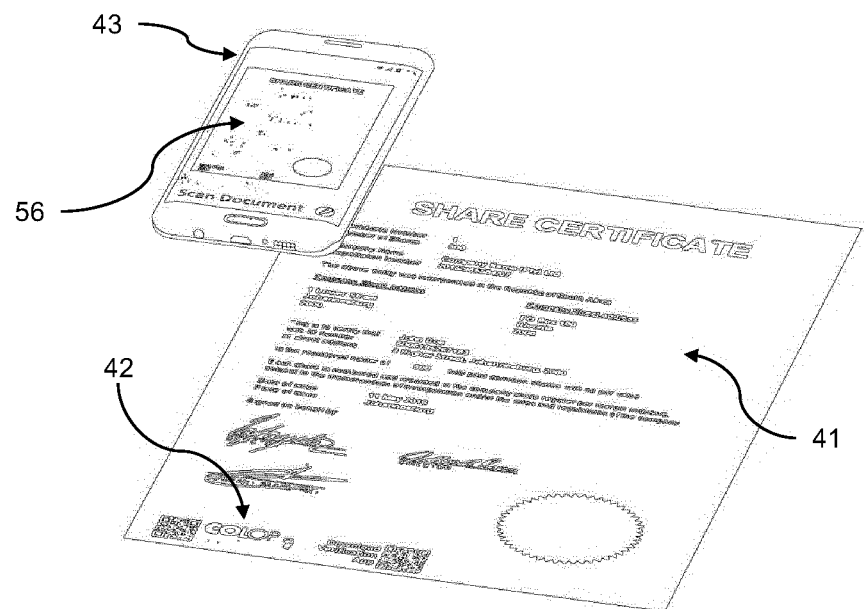

FIG. 8 shows an exemplary version of a simple method for verifying a document 41 having a visual marking 42. The purpose of the verification is to determine the origin of the visual marking 42 and, as an extension, validate the integrity of the content of the document 41 carrying the visual marking 42. The method as described in detail here can be carried out by a personal device 43 having a display 44, a camera and a data connection, e.g. a smartphone.

The user receives 45 the document 41 and desires to verify the authenticity of the document 41. In order to perform the verification, a verification application (e.g. called "Ver App") can be installed on the personal device 43. The user checks 46, whether the verification application is available on their personal device 43. In the negative 47, the user follows the instructions given in the visual marking 42 and scans 48 a separate QR-code (i.e. separate from the secure QR-code, which is based on the document identifier) with a link to initiate an installation procedure to configure the verification application on the personal device 43.

If the verification application was present from the beginning or has been installed successfully, the user enters 49 a verification command in the verification application, e.g. by pressing a button labelled "Verify authenticity of document". Triggered by this command, the application launches 50 a marking scanning view 51. The user is requested 52 and instructed to scan the secure QR-code of the visual marking 42. As soon as the secure QR-code is recognized and the document identifier determined, the verification application starts downloading 53 a copy of the document from the document storage service 13. The downloaded copy may be encrypted. The verification application starts decrypting 54 the encrypted copy with a private key of the registered personal device 43 and with a document key embedded in the visual marking 42. In parallel, the application enters 55 a document scanning view 56 and the user is prompted 57 to scan the whole document to be verified. Once the scanned whole copy is available and the downloaded copy is decrypted, the verification application compares 58 the two versions of the same document in order to determine whether the two versions match. The comparison may take into account additional product information, e.g. location or timestamp information.

Figure 14:
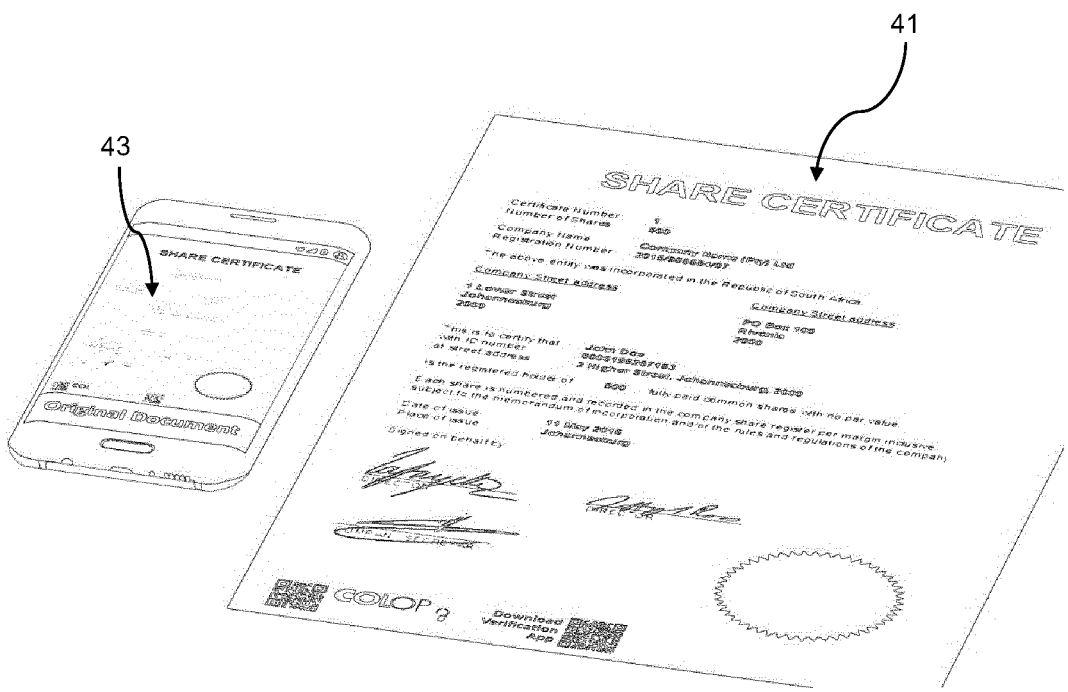
Figure 15:
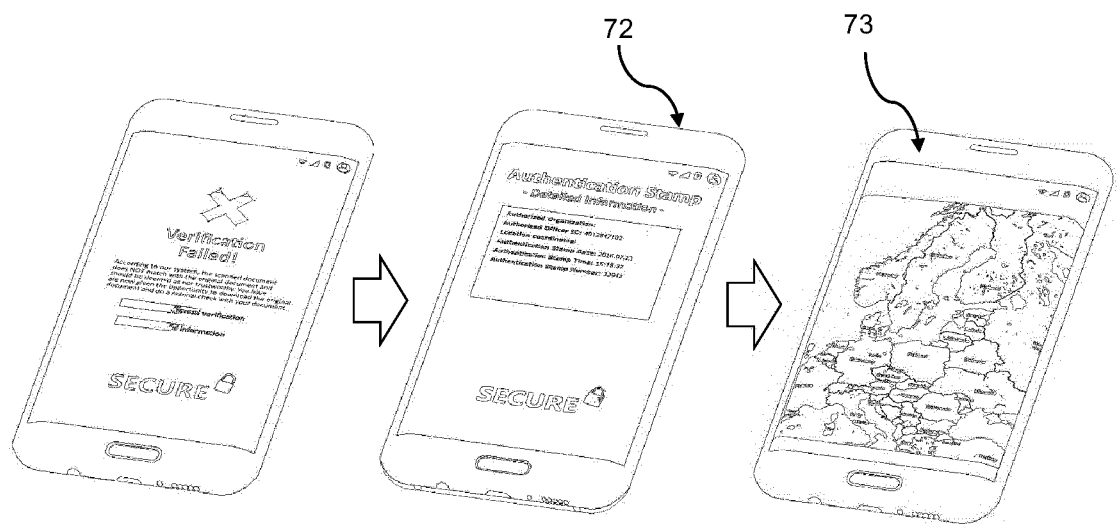

If the two versions match well enough 59, the verification was successful and the verification application shows 60 a confirmation 61 of the verification method. If the automatic comparison does not find a (sufficient) match, the verification application offers 62 to the user in a failure report 63 the possibility to command a "manual check of document" via a respectively labelled button. If the user decided to perform the manual check, this is preferred. The user is displayed the scanned copy 70 (See FIG. 14) and can put the hardcopy 71 side-by-side in order compare them 69. The official version is downloaded from the document storage service and optionally signed and/or encrypted. If the complete documents match 68, the verification process is complete 64. Otherwise, the verification application may offer 65 to display additional, detailed information related to the stamp products in a detailed view 72 and/or a location view 73 (to display locations of creation of the visual marking and of the token 3) in order to facilitate a manual verification, should the need arise (see FIG. 15). The verification application retrieves 66 all detailed information associated with the particular token. It is instructive that the present disclosure may be configured for the user to make their own judgement in the document 67 about the authenticity of the document. This is the last step in the verification method.

Figure 16:
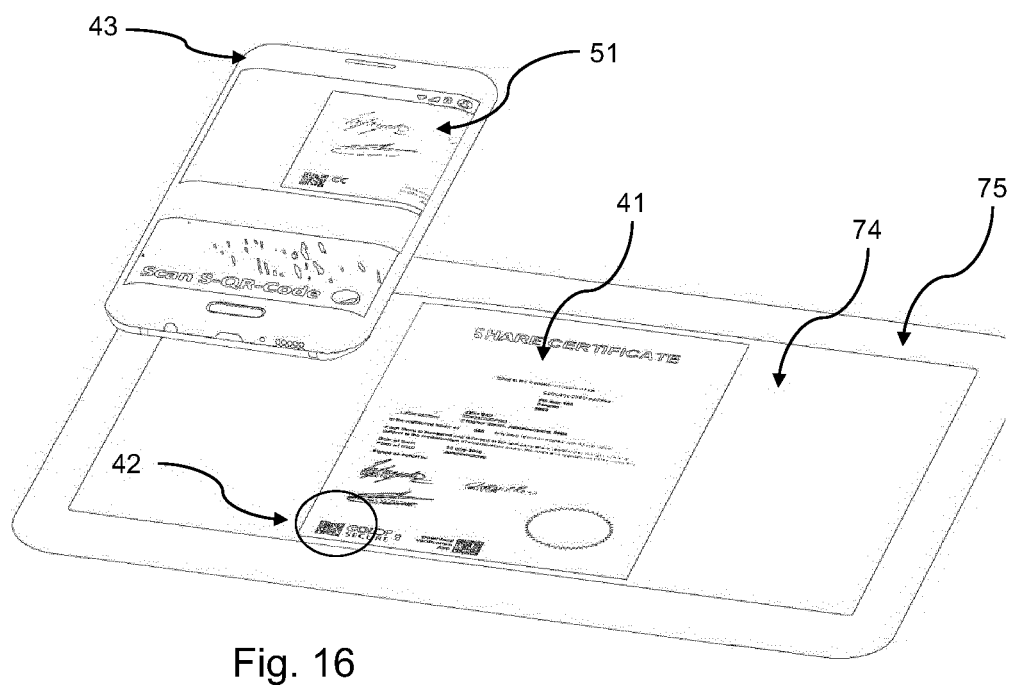

As can be seen in FIG. 16 the same method steps in principle apply for scanning electronic documents. Also, the visual markings of this type of document can be verified in the same manner as described above. In particular, the personal device 43 is shown with a marking scanning view 51, where the camera of the personal device 43 is directed at a screen 74 of a document viewing device 75, e.g. a tablet, laptop or personal computer. The visual marking 42 is displayed on said screen 74 together with the document 41, which in this case is an electronic document.

Figure 18:
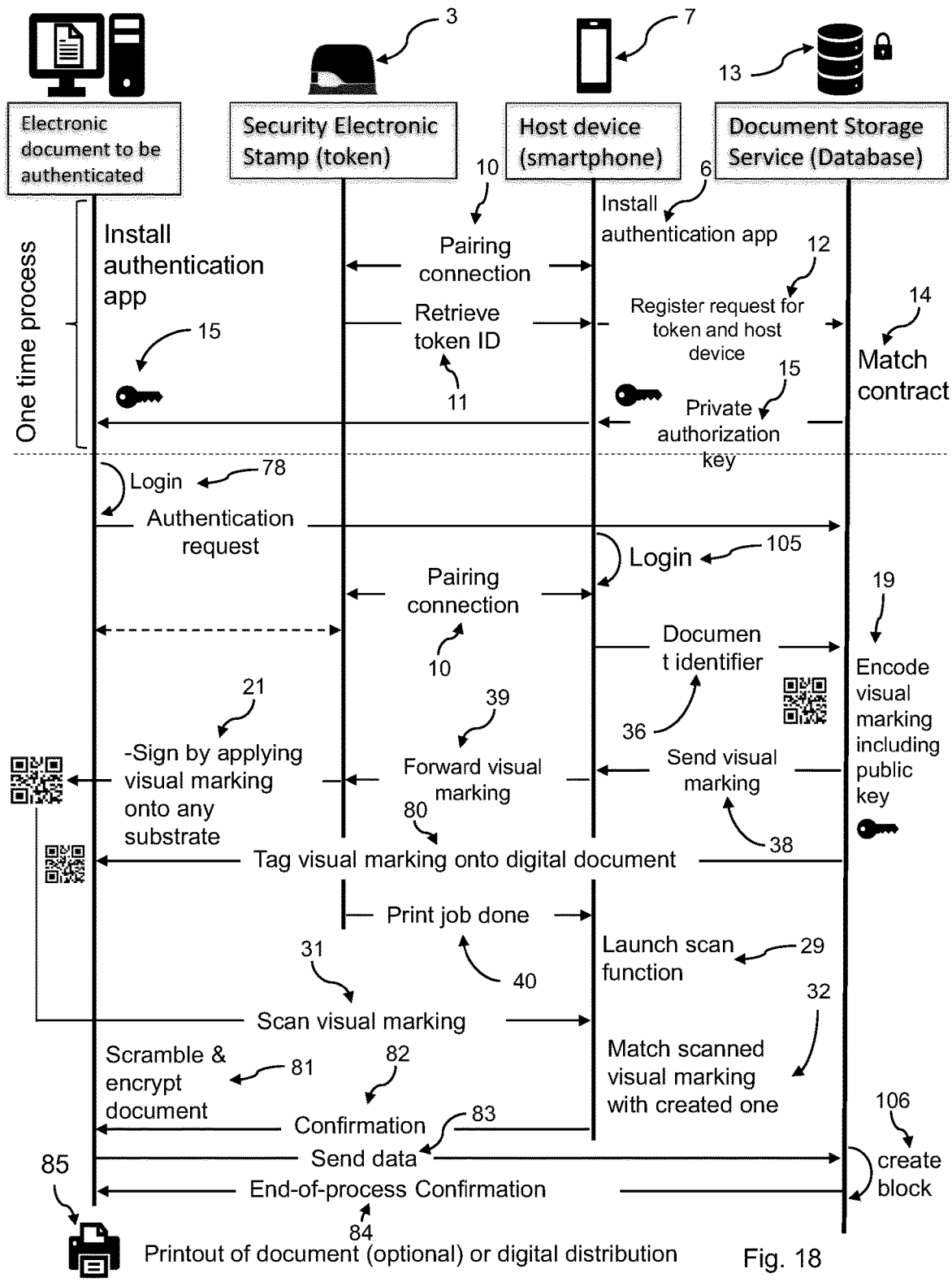
FIG. 18 schematically shows a sequence diagram of a method similar to that shown in FIG. 17, adapted for corroborating a digital document.

Correspondingly, FIG. 18 shows a further variation of the method for corroborating a document according to the present disclosure. Specifically, in the example shown in FIG. 18, the document that shall be corroborated is an electronic document stored and processed on a document editing device 76. During the initialisation procedure 1, a document authentication application is installed 77 on the document editing device 76. The pairing and messages between the token 3, host device 7 and document storage service 13 are similar as described in connection with FIG. 17. Only at the end of the procedure, in addition, a copy of the private authorization key 15 is transmitted to the document editing device 76, optionally via the host device 7.

The steps for performing the actual corroboration, i.e. once the initialisation procedure 1 is finished, begin with a login 78 of an authorized user with their credentials at the document editing device 76. Triggered by a user command, the document editing device 76 sends a request for authentication and to perform corroboration of an electronic document to the document storage service 13. In no particular order, but roughly at the same time, the user also performs a login 105 at the host device 7, similar to what has been described in connection with FIG. 17. By each login 78, 105, access to the private authorization key 15 is granted and with that access, the host device 7 and, optionally, also the document editing device 76 establish a pairing connection 10, 79 with the token 3. The next steps, from transmitting 36 the document identifier until scanning 31 the printed visual marking and performing the verification 32 are the same as described in connection with FIG. 17, with the exception that the visual marking is not printed to the document to be corroborated, but on any arbitrary available substrate (e.g. any paper) and scanned from there. This process of printing is used as a physical confirmation that the token 3 has actually been under the control of the user performing the corroboration. In parallel, the visual marking is transmitted 80 from the document storage service 13 to the document editing device 76, optionally protected with the authorization key 15 (e.g. encrypted with the public key). This transmission may be performed via a general-purpose data connection, e.g. via a cloud, or alternatively may be proxied through the host device 7 and/or the token 3. The document editing device 76 places the visual marking into the electronic document and then scrambles and encrypts 81 the resulting marked electronic document. Once the verification 32 succeeds, the host device 7 transmits a confirmation message 82 to the document editing device 76. Alternatively, the scanning 31 does not need to be performed with the host device 7, but can be performed by a general-purpose document scanner connected to the document editing device 76. In that case, the verification 32 may be performed by the document editing device 786 locally. After receiving said confirmation (or local verification), the document editing device 76 sends 83 the marked version of the electronic document to the document storage service 13 for creating 106 a block in the block chain database. Once the block is appended to the database, the document storage service 13 confirms 84 completion of the corroboration of the electronic document back to the document editing device 76. Based on this confirmation, the document editing device 76 may print 85 the marked version of the electronic document and/or begin digital distribution (e.g. via email).

Figure 19:
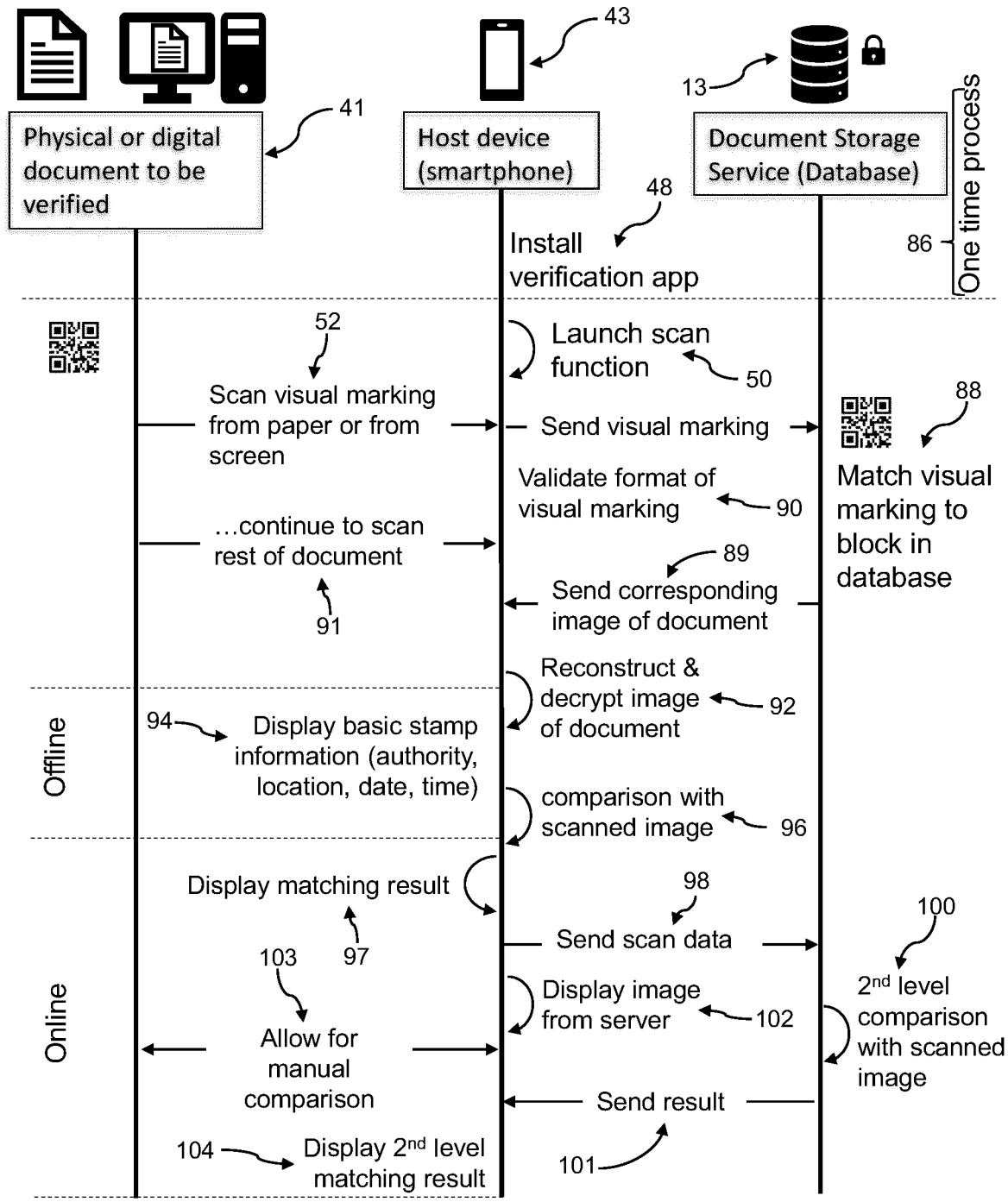
FIG. 19 schematically shows a sequence diagram of a method similar to the method shown in FIG. 8 for verifying a document having a visual marking.

FIG. 19 shows in more detail two variations of a method for verifying a document 41 (physical or electronic) having a visual marking 42. During an initialization procedure 86, which is naturally a one-time process per personal device 43, the user installs 48 (see FIG. 8) a verification application on the personal device 43. When the user enters 49 the verification command, the application launches 50 the marking scanning view, which can be a video scan function (i.e. a live preview with automatic document recognition and capture). The personal device 43 scans 52 the visual marking 42 on the document 41. The visual marking 42 may be a QR-code having an encoded data content. The personal device 43 sends 87 the visual marking (or a data content thereof) to the document storage service 13. The document storage service 13 matches the visual marking, and e.g. the document identifier contained in the received visual marking, with a stored copy of the identified document or a stored representation (e.g. hash) of that copy. With this information, the document storage service 13 searches 88 for a block in its database of blocks comprising a cryptographic hash of that same copy. If a matching block is found, the document storage service 13 sends a confirmation 89 together with the associated copy (or with a link to said copy), to the personal device 43. In the meantime, the personal device 43 locally validates 90 the format of the visual marking 42 and continues to scan 91 any further parts of the document 41. After receiving the copy from the document storage service 13, the personal device 43 decrypts and reconstructs 92 (i.e. de-scrambles) the received copy. In a first variation 93 of the method illustrated in FIG. 19, the verification is performed offline, e.g. due to lack of network coverage and online access. In this case, the above steps are limited to the local validation 90 of the visual marking 42. After that, a data content embedded in the visual marking 42 is displayed 94 on the personal device 43 for reference and manual verification. In the present example, the displayed data comprises information concerning the corroboration (e.g. regarding the issuer/authority, location, date and time). The user can verify plausibility of the displayed information.

Figure 12:
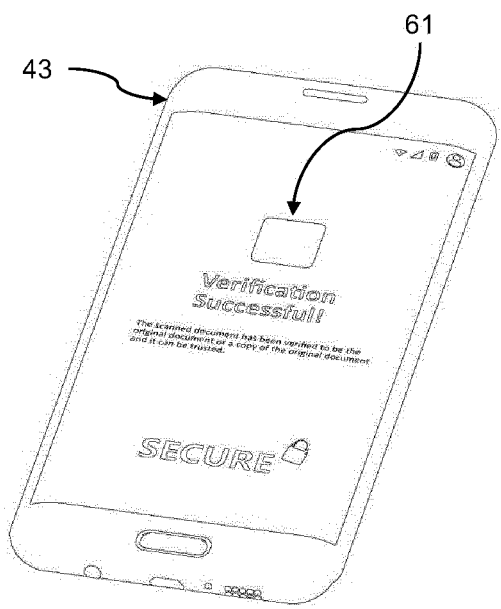
Figure 13:
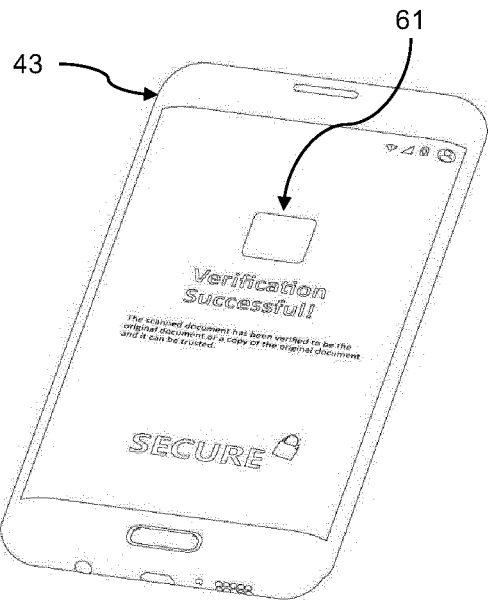

In a second variation 95, the method for verification is performed with access to the document storage service 13, e.g. online access. In that case, the personal device 43, based on the received document copy, performs a first level automated image comparison 96 between a scanned document (in step 91) and the received copy. The results of this comparison are displayed 97 to the user for reference. In addition, the matching result is transmitted 98 to the document storage service 13. The newly scanned copy is also transmitted 99 to the document storage service 13. The document storage service 13 performs a second level automated image comparison 100 between the document copy registered during corroboration and the new copy just received from the personal device 43. It then sends 101 the result of this second level comparison to the personal device 43 for information of the user. During these remote steps, the personal device 43 locally displays 102 the received document copy previously received from the document storage service 13 to allow for manual comparison 103 with the document to be verified. Finally, after the personal device 43 receives the outcome of the second level image comparison, it displays 104 also this outcome for consideration of the user. If both automated image comparisons yield a similarity above a certain threshold, the personal device 43 indicates the confirmation 61 (see FIG. 12).

The invention claimed is:

1. A method for corroborating a document, the method comprising:
    providing a registered token with a token identity, wherein the token is adapted to print visual markings;
    obtaining a document identifier based on at least the token identity and a timestamp;
    obtaining a document key;
    encoding the document identifier and the document key into a visual marking;

applying the visual marking to the document;
obtaining a copy of the document with the visual marking;
encrypting the copy with an encryption key configured to generate an encrypted copy decryptable using the document key;
storing the encrypted copy in association with the document identifier.

2. The method according to claim 1, wherein before storing the encrypted copy,
printing the visual marking using the token, and
retrieving and verifying the printed visual marking.

3. The method according to claim 1, wherein the token is paired to an internet enabled host device which allows one or more of the following:
secure login into the token by means of biometric-, password-and/or pin identification of an authorized user;
send a document identifier to a document storage database;
retrieve a visual marking from the said database;
send a visual marking to the token;
taking an image or sequences of images of the document;
sending encrypted and/or scrambled images to the document storage database;
receiving a confirmation message from the document storage database.

4. The method according to claim 1, wherein the document is an electronic document and wherein applying the visual marking to the document comprises modifying the electronic document to include the visual marking.

5. The method according to claim 1, wherein the document is a physical document, and obtaining a copy of the document comprises taking an image of the physical document before or after applying the visual marking to the document.

6. The method according to claim 5, wherein applying the visual marking to the document comprises printing the visual marking on the physical document using the token.

7. The method according to claim 1, wherein storing the encrypted copy in association with the document identifier comprises transmitting the encrypted copy together with the document identifier to a document storage service, wherein the document storage service stores the transmitted copy and an association with the document identifier.

8. The method according to claim 7, wherein the document storage service comprises a database of blocks and storing the transmitted copy comprises creating a block containing at least a cryptographic link to a previous block, a timestamp of the document identifier and a cryptographic hash of the transmitted copy.

9. A method for verifying a document having a visual marking, the method comprising:
retrieving the visual marking from the document;
analyzing the visual marking to obtain a document identifier and a document key encoded in the visual marking;
retrieving an encrypted copy of the document using the document identifier;
decrypting the encrypted copy using the document key to obtain an unencrypted copy;
providing the unencrypted copy for verification of the document.

10. The method according to claim 9, wherein the document is a physical document, and retrieving the visual marking from the document comprises taking an image or a sequence of images of the physical document and locating the visual marking within the images.

11. The method according to claim 9, wherein retrieving the encrypted copy of the document comprises sending a request with the document identifier to a document storage service and receiving the encrypted copy of the document associated with the document identifier from the document storage service.

12. The method according to claim 9, wherein providing the unencrypted copy for verification of the document comprises displaying the unencrypted copy on a screen for visual comparison.

13. The method according to claim 9, wherein providing the unencrypted copy for verification of the document comprises performing a comparison between the unencrypted copy and a new copy of the document with the visual marking and signaling a result of the comparison, wherein the new copy is obtained for comparison verification.

14. A system comprising:
a registered token comprising:
a storage holding a token identity and
a printing unit,
wherein the token is adapted to print visual markings encoding a document identifier based on the token identity and a timestamp;
an internet enabled host device and a document storage database;
wherein the token is paired to the internet enabled host device;
wherein the internet enabled host device is configured to:
secure login into the token by means of biometric-, password-and/or pin identification of an authorized user,
send the document identifier to the document storage database,
retrieve the visual marking from the document storage database,
send the visual marking to the token,
encode the document identifier and a document key into the visual marking,
apply the visual marking to the document,
take an image or sequences of images of the document,
generate an encrypted image or sequence of images of the document with an encryption key, the encrypted image or sequence of images being decryptable with the document key,
send the encrypted image or sequence of images to the document storage database with the document identifier,
receive a confirmation message from the document storage database.

15. The system according to claim 14, wherein the document storage database is provided by a document storage service and the document storage service is configured to receive and store an encrypted copy of a document in association with a document identifier.

* * * * *